(12) United States Patent
Garduno Estebanez et al.

(10) Patent No.: US 10,895,089 B2
(45) Date of Patent: Jan. 19, 2021

(54) WIND TURBINE TOWER WITH REINFORCING ELEMENTS

(71) Applicant: NORDEX ENERGY SPAIN, S.A.U., Navarra (ES)

(72) Inventors: Aitor Garduno Estebanez, Navarra (ES); Teresa Arlaban Gabeiras, Navarra (ES); Alexandre Cal Hernandez, Navarra (ES); Ivan Garcia Maestre, Navarra (ES); Jose Luis Aristegui Lantero, Navarra (ES); Jose Miguel Garcia Sayes, Navarra (ES); Miguel Nunez Polo, Navarra (ES)

(73) Assignee: NORDEX ENERGY SPAIN, S.A.U., Navarra (ES)

( * ) Notice: Subject to any disclaimer, the term of this patent is extended or adjusted under 35 U.S.C. 154(b) by 0 days.

(21) Appl. No.: 16/225,649

(22) Filed: Dec. 19, 2018

(65) Prior Publication Data

US 2019/0186166 A1    Jun. 20, 2019

(30) Foreign Application Priority Data

Dec. 19, 2017   (EP) .................................... 17382863

(51) Int. Cl.
| | |
|---|---|
| *E04H 12/12* | (2006.01) |
| *E04H 12/34* | (2006.01) |
| *F03D 13/20* | (2016.01) |

(52) U.S. Cl.
CPC ............. *E04H 12/12* (2013.01); *F03D 13/20* (2016.05); *E04H 12/342* (2013.01);
(Continued)

(58) Field of Classification Search
CPC ....... E04H 12/12; E04H 12/34; E04H 12/342; F03D 13/20; F05B 2240/912; F05B 2230/60; F05B 2240/40
See application file for complete search history.

(56) References Cited

U.S. PATENT DOCUMENTS

| | | | | |
|---|---|---|---|---|
| 9,850,674 | B1 * | 12/2017 | Paura ................... | E04H 12/085 |
| 2007/0294955 | A1 * | 12/2007 | Sportel ................. | E04H 12/085 |
| | | | | 52/40 |

(Continued)

FOREIGN PATENT DOCUMENTS

| | | |
|---|---|---|
| CN | 203783827 U | 8/2014 |
| DE | 3024647 A1 | 1/1982 |

(Continued)

*Primary Examiner* — Jessie T Fonseca
(74) *Attorney, Agent, or Firm* — Hayes Soloway PC (57) ABSTRACT

Wind turbine tower with reinforcing elements. The wind turbine tower comprises at least a first section (1) comprising at least two segments (2) defining at least two vertical joints (3) disposed between the at least two segments (2), at least two reinforcing elements (4) placed in each vertical joint (3), and at least an upper region (5) disposed above at least a lower region (6). The reinforcing elements (4) are configured to provide a first shear strength (1ss) in the at least upper region (5) and a second shear strength (2ss) in the at least lower region (6), the first shear strength and the second shear strength having different values and being enough to bear a maximum expected shear force in the vertical joints (3).

10 Claims, 9 Drawing Sheets

(52) U.S. Cl.
CPC ....... *F05B 2230/60* (2013.01); *F05B 2240/40* (2013.01); *F05B 2240/912* (2013.01)

(56) References Cited

U.S. PATENT DOCUMENTS

| | | | |
|---|---|---|---|
| 2008/0209842 A1* | 9/2008 | Montaner Fraguet | ........................ E04H 12/12 52/651.07 |
| 2010/0281818 A1* | 11/2010 | Southworth | ............ E02D 27/42 52/745.17 |
| 2012/0023860 A1 | 2/2012 | Voss et al. | |
| 2013/0000241 A1* | 1/2013 | Jensen | .................. E04H 12/085 52/651.01 |
| 2013/0025229 A1* | 1/2013 | Kapitza | .................... E04H 12/12 52/583.1 |
| 2014/0298737 A1* | 10/2014 | Fernandez Gomez | ........................ E04H 12/12 52/220.1 |
| 2015/0096240 A1* | 4/2015 | Arlab | .................... E04H 12/342 52/40 |
| 2016/0160491 A1* | 6/2016 | Ladret | .................... E04B 1/043 52/223.6 |
| 2016/0201350 A1* | 7/2016 | Zavitz | .................. E02D 27/425 52/223.5 |

FOREIGN PATENT DOCUMENTS

| | | |
|---|---|---|
| EP | 3187658 A1 | 7/2017 |
| ES | 2545038 A1 | 9/2015 |
| FR | 2732714 A1 | 10/1996 |
| JP | 2013096164 A | 5/2013 |
| JP | 5827102 B2 | 12/2015 |
| WO | 2017046624 A1 | 3/2017 |

* cited by examiner

WIND TURBINE TOWER WITH REINFORCING ELEMENTS

CROSS-REFERENCE TO RELATED APPLICATIONS AND PRIORITY

This patent application claims priority from ES Patent Application No. EP17382863.3 filed Dec. 19, 2017, which is herein incorporated by reference in its entirety.

OBJECT OF THE INVENTION

The present invention provides a wind turbine tower. The proposed wind turbine tower comprises at least a section comprising at least two precast segments forming at least a vertical joint and at least two reinforcing elements in said vertical joint. The reinforcing elements provide at least a first shear strength and a second shear strength along the height of the at least a section of the tower.

BACKGROUND OF THE INVENTION

The goal of wind energy consists of generating electricity from the wind through wind turbines with maximum efficiency and minimum cost. These wind turbines comprise basically a tower, a nacelle that houses the electric generator and a rotor comprising three blades.

The tower is in charge of supporting all elements located in the nacelle and transmitting both the aerodynamic and operating conditions forces to the foundation.

Some towers are made of reinforced concrete modular sections. Each section comprises at least two segments and the joining surface between segments is called vertical joint.

Performing a vertical joint has technical difficulties because the shear strength of concrete is not enough to bear shear forces distribution along the vertical joint. Consequently, reinforcing elements have to be disposed embedded in the concrete of the vertical joint. Said elements confer enough shear strength to the vertical joint.

The setting of the vertical joints is a bottleneck in the process of wind turbine tower assembly. Usually, the connection of these segments requires pouring mortar within vertical joints for them to achieve the required resistance. There are also other alternatives such as dry joints, postensioned systems, etc.

Specifically, the process of pouring mortar (grouting) in vertical joints involves the use of auxiliary elements called formworks, usually attached to adjacent segments, to retain the mortar that has been poured. The placement of said formworks is made on the worksite, once the precast segments are positioned to form a section according to dimensional tolerances, and it requires several hours. When the mortar is hardened these elements are removed.

Traditionally mortar is poured by gravity in the vertical joints taking advantage of the gravitational action which facilitates the filling of this type of joint. However, because of the high hydrostatic pressure generated by the column of mortar, leakages can appear. That would make the finish surface of the joints of the precast segments to be irregular.

Another technical problem is that the formworks need to be temporarily fastened to the precast segments to guarantee its position and unfasted once the hardening phase finishes on each vertical joint. All of these operations and auxiliary tools increase the cost of the tower.

Furthermore, during the pouring and mortar hardening stages, it is necessary to ensure minimum conditions of temperature (at least 5° C.) in both the precast segments in order to ensure a proper curing of the mortar, otherwise, its mechanical properties (strength) could be affected.

From the state of the art there are known alternative solutions which avoid the use of mortar in the vertical joints. For example, in document JP5827102, it is described an installation method of a precast member comprising a step of connecting a first precast member having a first hole part capable of housing a connecting rod to an existing concrete structure; a step of connecting a second precast member having a second hole part into which the distal end side of the connecting rod can be inserted to the existing concrete structure so as to be adjacent to the first precast member; a step of sliding the connecting rod housed in the first hole part in the direction of the second precast member, and inserting the distal end side of the connecting rod to the second hole part; and a step of packing a liquid filler in the first hole part and the second hole part after sliding the connecting rod.

It is also known document CN203783827 which describes a wind tower member longitudinal seam precast concrete structure. It comprises a first cylinder wall and a second cylinder wall. The longitudinal joint contact faces of the first cylinder wall and the second cylinder wall are respectively provided with locating keys distributed at intervals. A locating key groove matched with the corresponding locating key is arranged between every two adjacent locating keys. A connecting hole channel is reserved in each locating key. A steel pipe is buried in the hole channel. After the locating keys are aligned with the locating key grooves, steel pipes in all the hole channels in the locating keys are located at the same vertical position, and through holes in the steel pipes vertically penetrate in the vertical direction. A steel bar is inserted in the through hole penetrating through each steel pipe. Finally, the integral component is formed through a whole through a grouting form.

Also, in ES2545038 it is disclosed a system comprising the steps of obtaining a profile extruding from truncated cone sections that conform as much as possible to the ideal curved profile of the tower; using pre-stressed cables, which are factory-tensioned before installing the rebar, and tendons that pass through the arch stones, making it possible to link various arch stones with one another; and reducing the thickness of the arch stones; and arranging the rebar in only one layer.

DESCRIPTION OF THE INVENTION

The present invention discloses a wind turbine tower with reinforcing elements. The essential feature of the present invention is that the reinforcing elements provide at least a first shear strength and a second shear strength along the height of the at least a section of the tower, the first shear strength and the second shear strength having different values and being enough to bear a maximum expected shear force in the vertical joints.

The wind turbine tower comprises at least two segments defining at least two vertical joints disposed between the at least two segments and the tower comprises at least an upper region disposed above at least a lower region.

The shear strength of the vertical joints along the height of the tower is, according to the present invention, greater in the upper part of the tower than in the lower part of the tower.

In a preferred embodiment of the invention, the reinforcing elements are selected between horizontal rebars and curved bolts, known from the state of the art. The term cross section or diameter is used indistinctly throughout the description since in this case the cross section of the horizontal rebars and curved bolts is a circle. Taking into account factors such as the number of reinforcing elements, the size of the cross section (diameter) and the distance between reinforcing elements along the height of the tower, as it will be described later, is possible to reach a certain value of shear strength.

There are several options to achieve said certain value of shear strength:

- with reinforcing elements having a first diameter and separated from each other by a first distance along the height of the vertical joint;
- with reinforcing elements having a second diameter and separated from each other by a second distance along the height of the vertical joint, being the second diameter smaller than the first diameter and the second distance shorter than the first distance;
- or with groups of reinforcing elements separated from each other by a third distance along the height of the vertical joint, each group placed substantially at the same height and each reinforcing element of the group of reinforcing elements having a third diameter smaller than the first diameter, being the third distance dependent on the equivalent cross section of the group of reinforcing elements for a certain level of shear strength.

The present invention is aimed at providing reinforcing elements with a separation between them and an adequate cross-section to bear the shear force required at each height of the tower. An associated advantage is that material is saved.

In an embodiment of the invention the number of reinforcing elements per tower section (generally uniformly separated) and its diameter is defined for each section. In this case, the cross-section and/or distribution of the reinforcing elements are respectively equal and constant along the height of all the vertical joints of a same tower section and are different between different tower sections, in such a way that the maximum value of shear strength needed in the vertical joint for each tower section is achieved, but not a higher value corresponding to the shear strength of another tower section, for example, a higher tower section. The maximum value of shear strength of each tower section determines the design of the reinforcing elements (cross-section and/or distribution).

The reinforcing element or elements placed in the upper region of the tower provide the first shear strength and the reinforcing element or elements placed in the lower region of the tower provide the second shear strength.

In a preferred embodiment, the first shear strength value is greater than the second shear strength value.

According to the particular shear force distribution along the vertical joint the present invention describes a specific configuration of the reinforcing elements along the height of the tower.

The wind turbine tower with reinforced elements proposed provides an optimized solution in terms of shear strength.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

PREFERRED EMBODIMENT OF THE INVENTION

A description of some embodiments of the present invention is made according to FIGS. 1 to 13.

Figure 1:
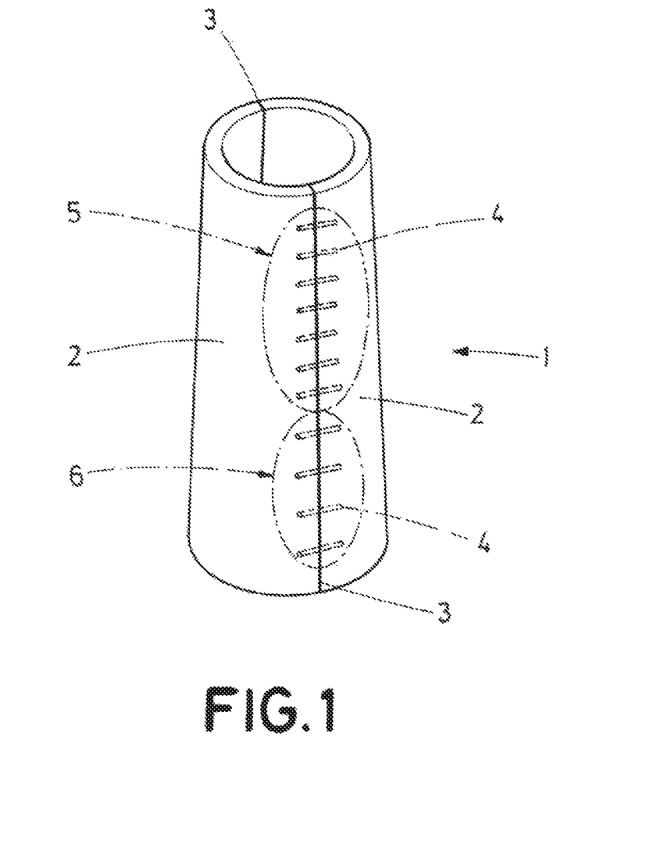
FIG. 1.—Shows a wind turbine tower section with reinforcing elements.

The wind turbine tower with reinforcing elements comprises, as illustrated in FIG. 1, at least a first section (1) comprising at least two segments (2) defining at least two vertical joints (3) disposed between the at least two segments (2). It also comprises at least two reinforcing elements (4) placed in each vertical joint (3) and at least an upper region (5) disposed above at least a lower region (6).

The essential technical feature of the wind turbine tower is that the reinforcing elements (4) are configured to provide a first shear strength (1ss) in the at least upper region (5) and a second shear strength (2ss) in the at least lower region (6). The first shear strength (1ss) and the second shear strength (2ss) have different values and are enough to bear a maximum expected shear force in the vertical joints (3).

The maximum expected shear force in the vertical joints (3) depends on the geometry, the material, the configuration, the installation, etc. of the wind turbine tower.

The number and diameter of the reinforcing elements (4) needed to bear the shear forces at each tower height shall be enough to cover the active loads expected at said tower height. In an embodiment of the invention, the vertical joints (3) of the upper part (5) of the tower are more reinforced than the vertical joints (3) of the lower part (6). On this regard, in a preferred embodiment of the invention, the first shear strength (1ss) is greater than the second shear strength (2ss).

Figure 2:
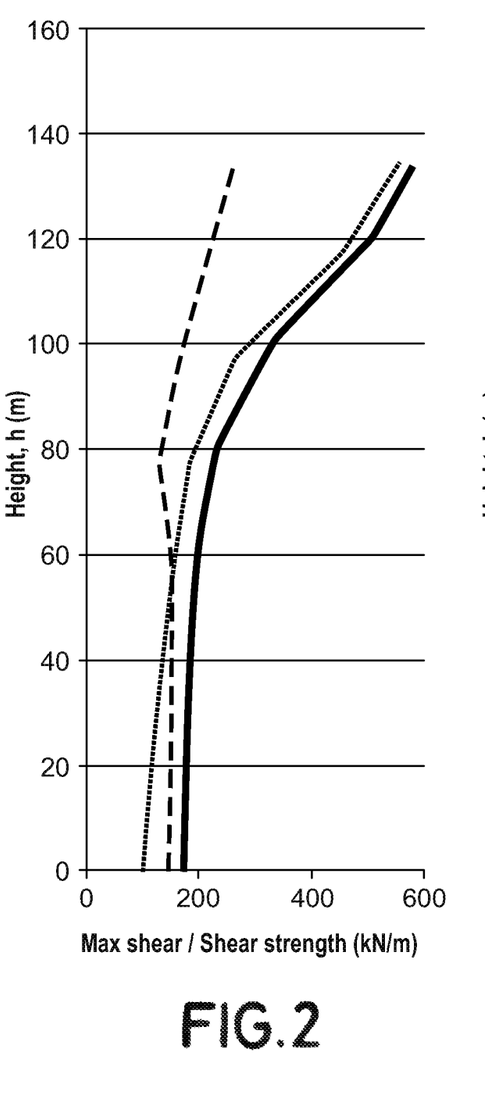
FIG. 2.—Shows a representation of the shear force distribution along the vertical joint of the tower due to maximum shear force (dashed line) experienced by the tower, the shear force distribution along the vertical joint of the tower due to maximum torque (dotted line) experienced by the tower and the minimum shear strength (thick line) to be obtained with the reinforcing elements.

FIG. 2 shows a graphic in which the relationship between the maximum shear force in kN/m (X axis) and the height of the tower in m (Y axis) has been represented; it also shows the relationship between the shear strength in kN/m (X axis) and the height of the tower in m (Y axis) provided by the reinforcing elements in one embodiment. In the graphic it has been also represented the minimum shear strength needed.

The shear strength curve of FIG. 2 has been adjusted to the maximum of both curves representing the relationship between the maximum shear and shear strength along the height of the tower. In this solution, the wind turbine tower comprises a plurality of reinforcing elements (4) with different diameters and/or different distances between reinforcing elements along the height of the tower.

This embodiment is possible but no preferred because the manufacture process is more time consuming. Preferably, the reinforcing elements (4) are configured in such a way that at least two different zones are created, one of them with a first shear strength (1ss) and the other with a second shear strength (2ss).

Figure 3:
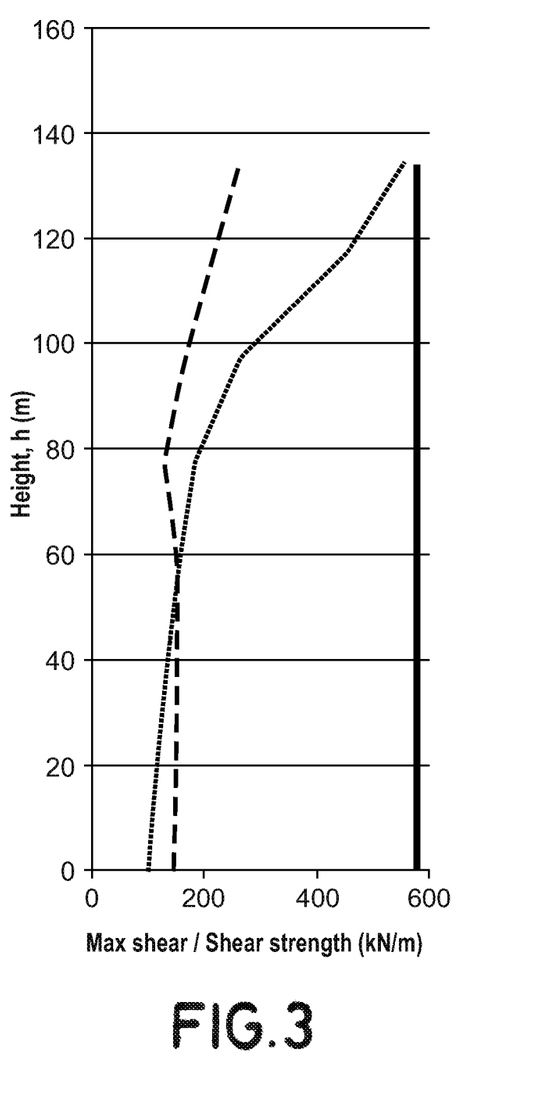
FIG. 3.—Shows a representation of the shear force distribution along the vertical joint of the tower due to maximum shear force (dashed line) experienced by the tower, the shear force distribution along the vertical joint of the tower due to maximum torque (dotted line) experienced by the tower and the shear strength (thick line) obtained with reinforcing elements in a wind turbine tower of the state of the art that is over dimensioned.

FIG. 3 has been included to show a configuration of a wind turbine tower comprising reinforcing elements (4) with a uniform distribution and those reinforcing elements (4) being of the same size. In this case, the reinforcing elements (4) in the lower part of the tower are oversized because they are all configured to bear the value of maximum shear force of the tower (which, according to the graphics is only reached at the tower top).

Figure 4:
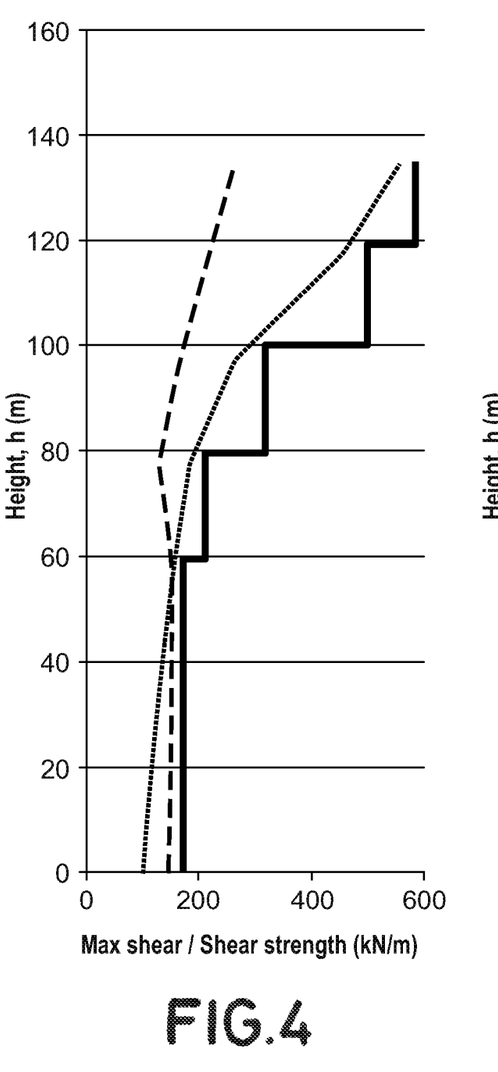
FIG. 4.—Shows a representation of the shear force distribution along the vertical joint of the tower due to maximum shear force (dashed line) experienced by the tower, the shear force distribution along the vertical joint of the tower due to maximum torque (dotted line) experienced by the tower and the shear strength (thick line) obtained with reinforcing elements in an upper region and in a lower region of the tower in an embodiment of the invention.

In FIG. 4 has been represented an embodiment of the invention wherein the cross-section and distribution of the reinforcing elements (4) do not change along the height of the tower sections up to 60 m but in sections 60 to 80, 80 to 100 and 100 to 120 m is different.

Figure 5:
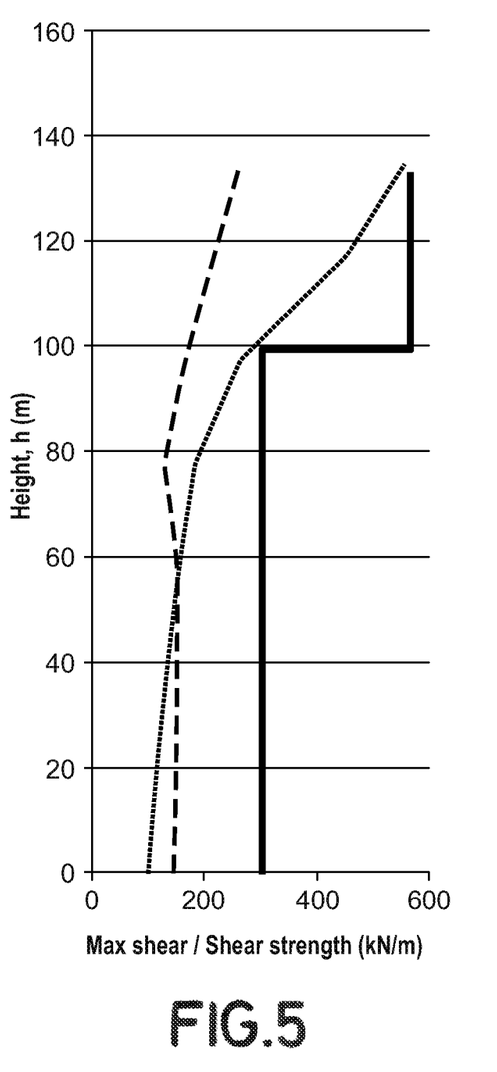
FIG. 5.—Shows a representation of the shear force distribution along the vertical joint of the tower due to maximum shear force (dashed line) experienced by the tower, the shear force distribution along the vertical joint of the tower due to maximum torque (dotted line) experienced by the tower and the shear strength (thick line) obtained with reinforcing elements in an upper region and in a lower region of the tower in another embodiment of the invention.

In FIG. 5 a graphic has been depicted showing the relationship between the maximum shear force in kN/m (X axis) and the height of the tower in m (Y axis); and the relationship between the shear strength in kN/m (X axis) provided by the reinforcing elements in one embodiment and the height of the tower in m (Y axis). In this case, it has also been represented a function showing the first shear strength (1ss) which in this case is achieved in the highest part of the tower and the second shear strength (2ss). As can be appreciated in the graphics, the function showing the first and the second shear strength (1ss, 2ss) is always over the maximum expected shear force. This embodiment of the invention is even more optimized (in terms of less time consuming during the manufacturing process) than the embodiment shown in FIG. 4.

In another embodiment of the invention, the number of reinforcing elements (4) per meter in the at least upper region (5) is higher than the number of reinforcing elements (4) per meter in the at least lower region (6).

Figure 6:
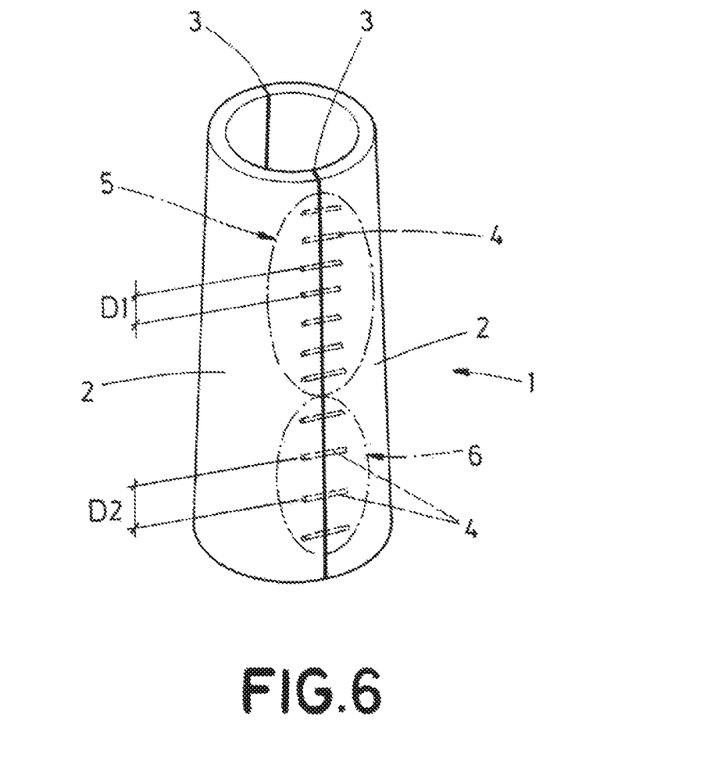
FIG. 6.—Shows an embodiment of the invention comprising a wind turbine tower section wherein the upper part of the tower is more reinforced than the lower part. The distance between the reinforcing elements of the upper region is smaller than the distance between the reinforcing elements of the lower region while the diameter of the reinforcing elements of both regions is equal.
Figure 7:
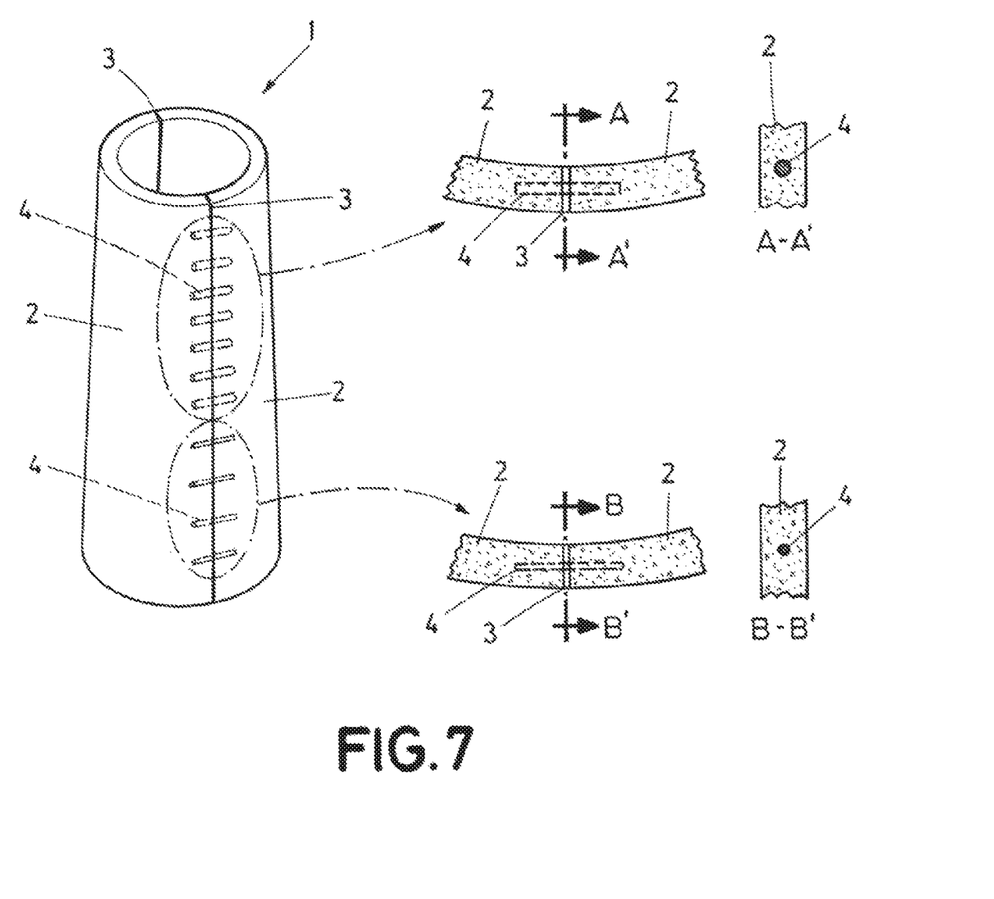
FIG. 7.—Shows another embodiment with a comparison between the cross-section of a reinforcing element of the upper region and the cross-section of a reinforcing element of the lower region.
Figure 8:
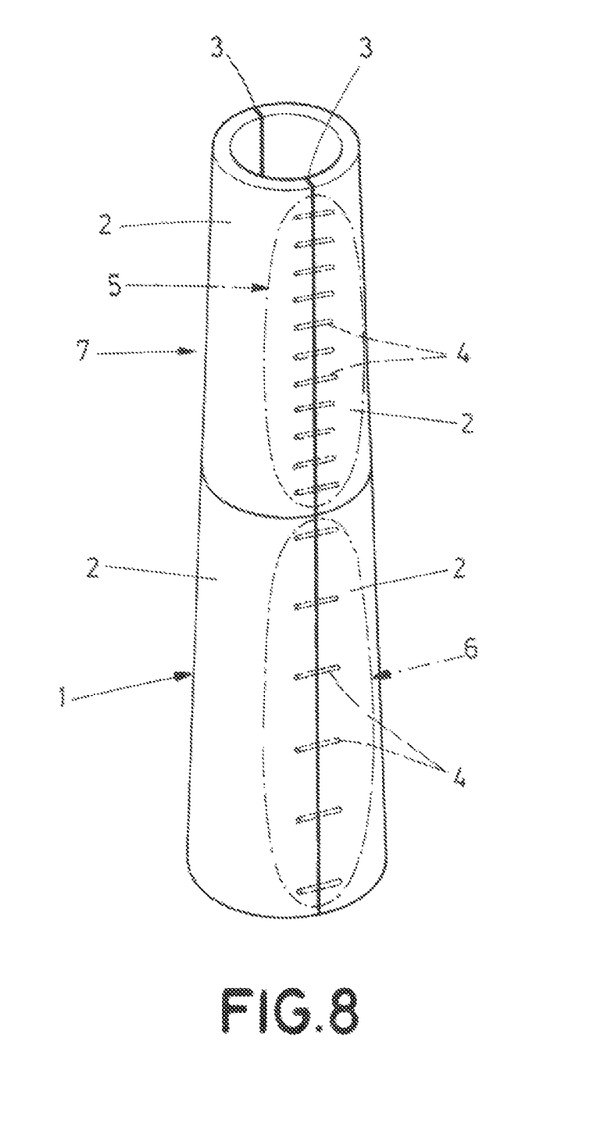
FIG. 8.—Shows a wind turbine tower with reinforcing elements comprising two sections.

As shown in FIG. 6, in an embodiment of the invention, there are at least two reinforcing elements (4) in the upper region (5) and at least two reinforcing elements (4) in the lower region (6). In this embodiment the upper part of the tower is more reinforced than the lower part, a first distance (D1) between reinforcing elements (4) of the upper region (5) is smaller than a second distance (D2) between reinforcing elements (4) of the lower region (6), while the diameter of the reinforcing elements (4) of both regions is equal.

In the present invention, by adapting the diameter of the reinforcing elements (4), the number and the distance between them it is possible to modify and better adapt the resistance capacity of the reinforcing elements (4) against the expected shear forces.

As previously described, the shear strength depends on the position of the reinforcing elements (4) and also on their measures. On this regard, in an embodiment of the invention, the cross-section of the reinforcing elements (4) of the upper region (5) is bigger than the cross-section of the reinforcing elements (4) of the lower region (6). The comparison between the cross-section of a reinforcing element (4) of the upper region (5) and the cross-section of a reinforcing element (4) of the lower region (6) can be appreciated in FIG. 7.

In an embodiment of the invention, as shown for example in FIG. 1, the upper region (5) and the lower region (6) are located in the at least first section (1). However, in FIG. 8 it has been represented an exemplary wind turbine tower in which the tower further comprises a second section (7) located above the first section (1) and in that the at least upper region (5) is located in the second section (7) and the at least lower region (6) is located in the first section (1).

Figure 9A:
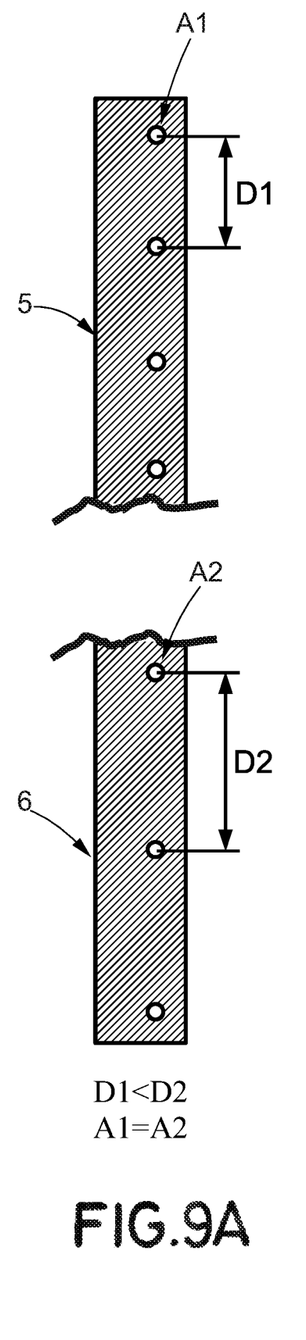
FIG. 9A-C.—Shows different embodiments of the wind turbine tower with reinforcing elements along the vertical joint to show the number and distance between reinforcing elements in an upper region and lower region of the wind turbine tower.
Figure 9B:
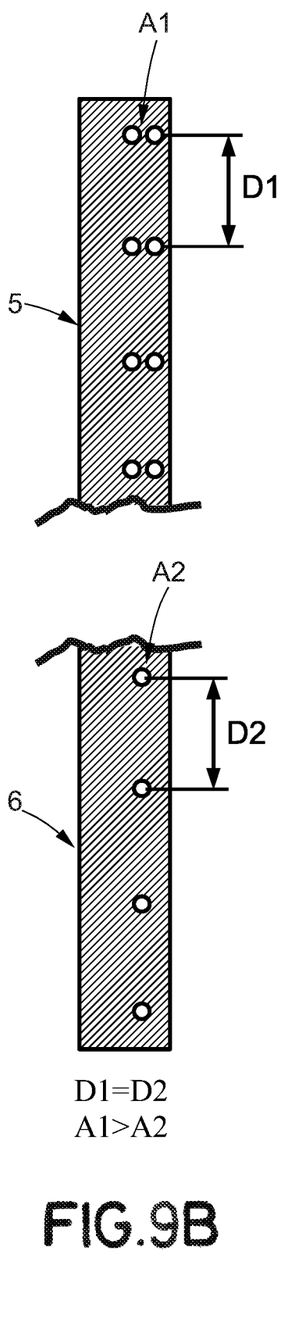
Figure 9C:
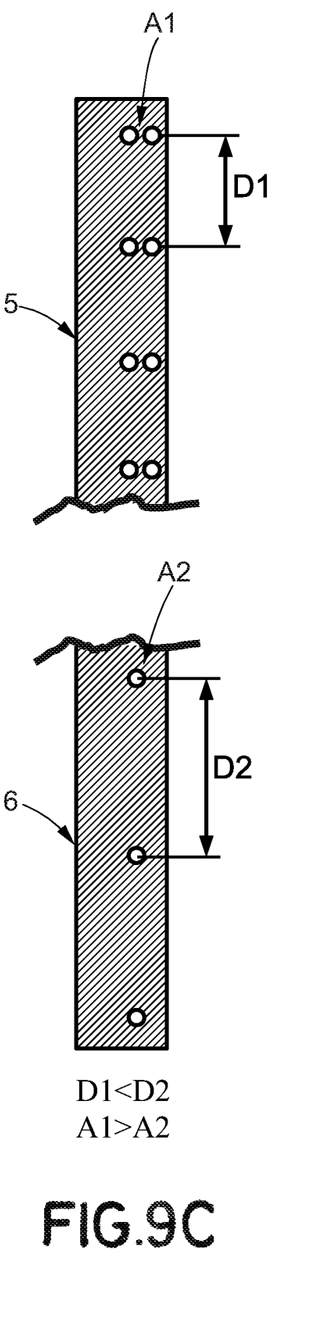

In FIGS. 9A-C different embodiments of sections of a reinforced vertical joint of the tower wherein the upper part of the tower is more reinforced than the lower part are shown. In these cases the reinforcing elements (4) of the upper region (5) of the tower provide a first shear strength (1ss) greater than the second shear strength (2ss) of the lower region (6) of the tower.

Specifically, in FIG. 9A it has been represented and embodiment of the wind turbine tower with reinforcing elements (4) in which the first distance (D1), which is the distance between reinforcing elements (4) of the upper region (5) is smaller than the second distance (D2), which is the distance between reinforcing elements (4) of the lower region (6) (D1<D2).

Another feature that can be appreciated in FIG. 9A is that A1=A2, wherein A is the sum of the areas Ai of the cross-section of all of the reinforcing elements (4) disposed at the same height of the tower in a vertical joint in each region (A1 for the upper region and A2 for the lower region), which depends on the number and the diameter of the reinforcing elements (4) (in this case it is supposed that the diameter of all the reinforcing elements (4) is the same). In this case, the number of reinforcing elements (4) at the same height of the tower in the upper region (5) is the same than the number of reinforcing elements (4) at the same height of the tower in the lower region (6).

In FIG. 9B it is represented another embodiment of the invention. In this case, the first distance (D1), which is the distance between reinforcing elements (4) of the upper region (5), is equal than the second distance (D2), which is the distance between reinforcing elements (4) of the lower region (6) (D1=D2). In addition, in this embodiment, A1>A2, the number of reinforcing elements (4) at the same height of the tower in the upper region (5) is higher than the number of reinforcing elements (4) at the same height of the tower in the lower region (6). The diameter of all the reinforcing elements (4) is the same.

In FIG. 9C it is represented another embodiment of the invention. In this case, the first distance (D1), which is the distance between reinforcing elements (4) of the upper region (5), is smaller than the second distance (D2), which is the distance between reinforcing elements (4) of the lower region (6) (D1<D2). In addition, in this embodiment, A1>A2, the number of reinforcing elements (4) at the same height of the tower in the upper region (5) is higher than the number of reinforcing elements (4) at the same height of the tower in the lower region (6). The diameter of all the reinforcing elements (4) is the same.

According to said FIGS. 9A-C, different embodiments of the invention are described. Different configurations of the wind turbine tower can be used to reach the minimum shear resistance depending on the estimated values of expected shear force. The embodiments depicted in FIGS. 9A-C are different options and the selection of one of them among the others could be made, for example, according to the available space for the reinforcing element (4) in the corresponding section of the wind turbine tower.

Exemplary, when it has been calculated the amount of material, preferably steel, needed for reinforcing the vertical joints of the wind turbine tower, said amount of material can be disposed in different ways in the vertical joints. In the present invention this is achieved by means of the reinforcing elements (4).

Figure 10:
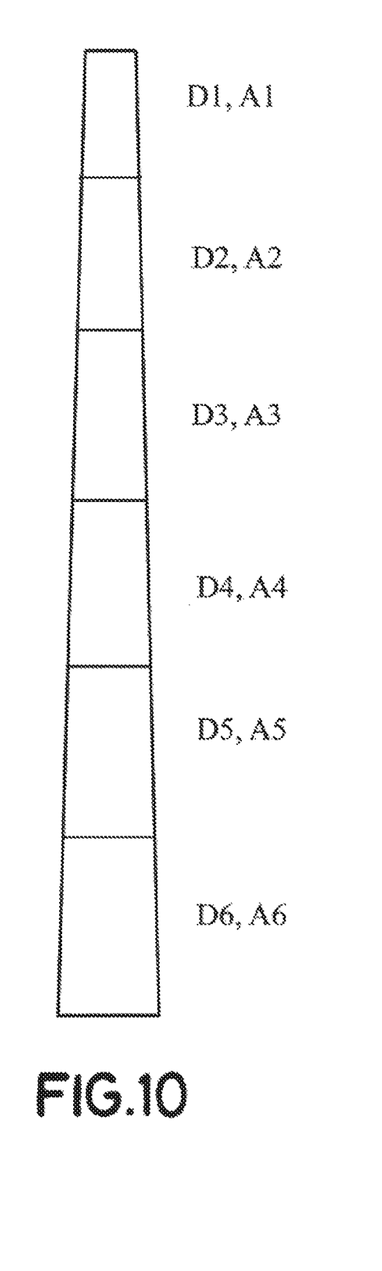
FIG. 10.—Shows a wind turbine tower with reinforcing elements comprising six sections.

In FIG. 10 has been represented a wind turbine tower with reinforcing elements (4) comprising a plurality of sections (a first section (1), a second section (7), a third section (8), a fourth section (9), a fifth section (10) and a sixth section (11)). It would be the same cases as in FIGS. 9A-C. In one embodiment of the invention, the distance between reinforcing elements (4) of each section is smaller than the distance between reinforcing elements (4) of the subsequent sections (D1<D2<D3<D4<D5<D6) and (A1=A2=A3=A4=A5=A6).

In another embodiment of the invention, the distance between reinforcing elements (4) of each section is equal to the distance between reinforcing elements (4) of the subsequent sections (D1=D2=D3=D4=D5=D6) and (A1>A2>A3>A4>A5>A6).

In a further embodiment of the invention, the distance between reinforcing elements (4) of each section is smaller than the distance between reinforcing elements (4) of the subsequent sections (D1<D2<D3<D4<D5<D6) and (A1>A2>A3>A4>A5>A6).

Figure 11:
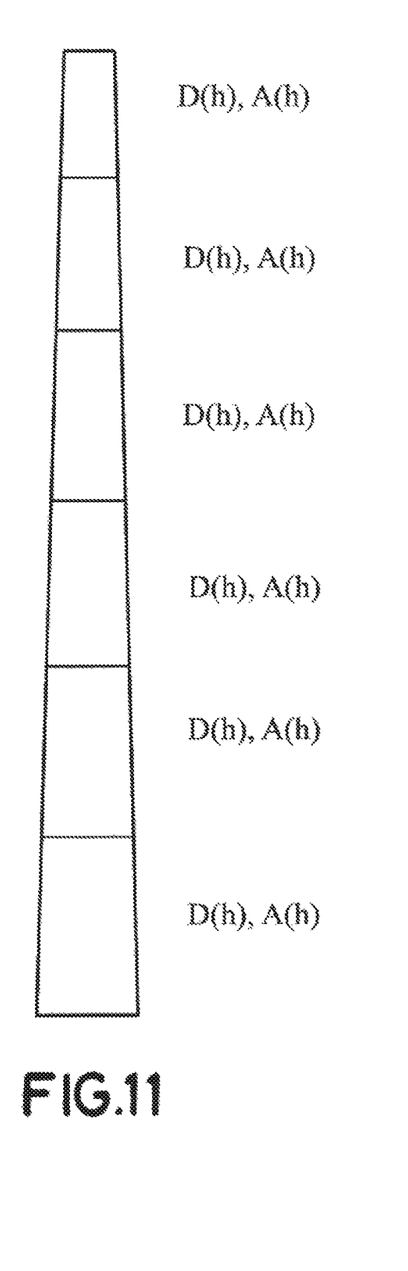
FIG. 11.—Shows a wind turbine tower with reinforcing elements in an embodiment in which the number and distribution of reinforcing elements are a function of the height of the tower.

In FIG. 11 it has been represented a wind turbine tower with reinforcing elements (4) wherein the values of the distance between reinforcing elements (4) and the values of A (dependent on the number of reinforcing elements disposed at the same height of the tower and the cross-section of the reinforcing elements) depend on the height of the tower. On this basis, in a fourth embodiment of the invention, the distance between reinforcing elements (4) follows a function dependent on the height at which the reinforcing element is located. The distance can be different between each pair of reinforcing elements (4) along the tower, increased in a continuous manner from top to bottom). That is to say, the separation between the reinforcing elements is crescent in a continuous manner between the upper region and the lower region.

In a fifth embodiment, the cross section of the reinforcing elements (4) follows a function dependent on the height at which the reinforcing element (4) is located.

Figure 12:
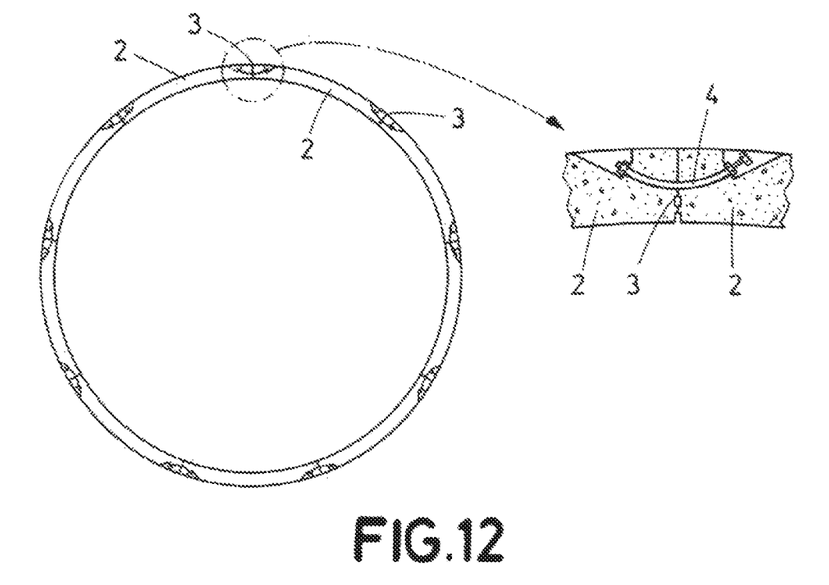
FIG. 12.—Shows a section of the wind turbine tower and a zoom view of a reinforcing element which in this case is a curved bolt.
Figure 13:
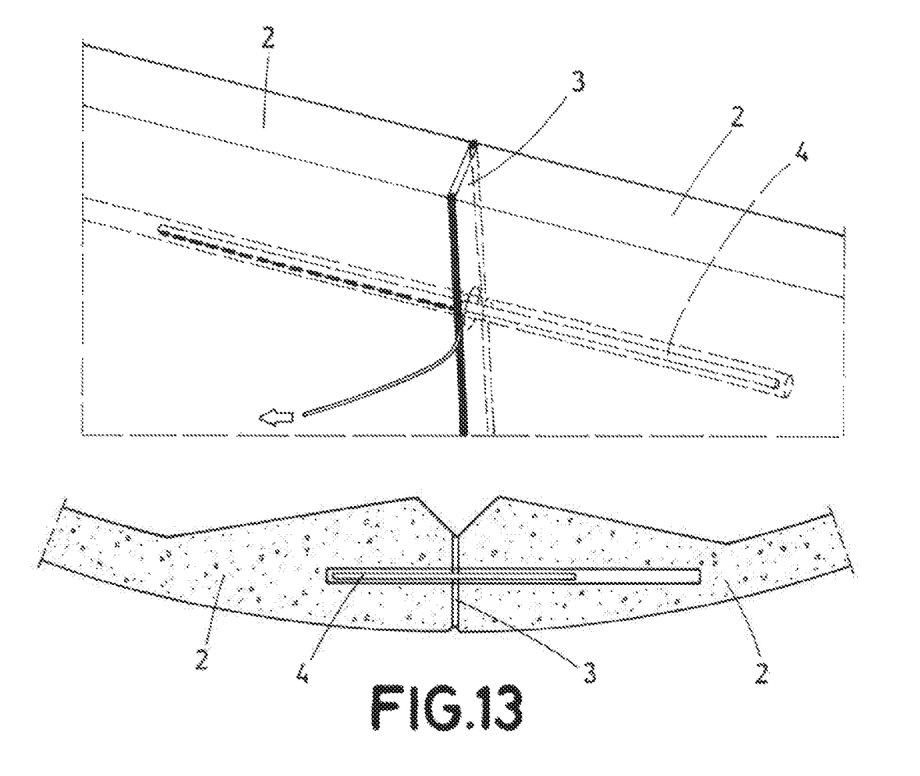
FIG. 13.—Shows a reinforcing element, which in this case is a rebar, embedded between two segments.

Preferably, the reinforcing elements (4) are disposed perpendicular to the vertical joints (3), as shown in the figures, and they are preferably selected between a bolt or a rebar. When the reinforcing elements (4) are bolts, they are preferably curved bolts as can be seen in FIG. 12. On the other hand, when the reinforcing elements (4) are rebars, they are preferably partially embedded in the at least two segments (2), as depicted in FIG. 13. As it can be seen in FIGS. 12 and 13, the reinforcing elements (4) are disposed transversely to the vertical joints (3) and extending at least partially through the at least two segments (2). Additionally, in an embodiment of the invention, the reinforcing elements (4) are configured to connect the segments (2) between them.

Also, the tower can be at least partially made of concrete.

The invention claimed is:

1. A wind turbine tower with reinforcing elements comprising:
    at least a first section comprising at least two segments defining at least two vertical joints disposed between the at least two segments,
    at least two reinforcing elements placed in each vertical joint,
    at least an upper region disposed above at least a lower region wherein the reinforcing elements are configured to provide a first shear strength in the at least upper region and a second shear strength in the at least lower region, the first shear strength and the second shear strength having different values, and
    wherein a relationship between the upper region and the lower region is selected from at least one attribute in the group consisting of:
        a number of the reinforcing elements per meter in the at least upper region is higher than a number of the reinforcing elements per meter in the at least lower region;
        at least two of the reinforcing elements are in the upper region and at least two of the reinforcing elements are in the lower region and a first distance along a height of the tower between the reinforcing elements of the upper region is smaller than a second distance between the reinforcing elements of the lower region;
        at least two of the reinforcing elements are in the upper region and at least two of the reinforcing elements are in the lower region and a first distance along the height of the tower between the reinforcing elements of the upper region is greater than a second distance between the reinforcing elements of the lower region;
        a cross-section of the reinforcing elements of the upper region is bigger than the cross-section of the reinforcing elements of the lower region.

2. The wind turbine tower of claim 1 wherein the first shear strength is greater than the second shear strength.

3. The wind turbine tower of claim 1 wherein the vertical joints in the at least one of the upper regions and/or the lower region comprise more than one reinforcing element.

4. The wind turbine tower of claim 1 wherein the upper region and the lower region are located in the at least first section.

5. The wind turbine tower of claim 1 wherein the tower further comprises a second section located above the first section and in that the at least upper region is located in the second section and the at least lower region is located in the first section.

6. The wind turbine tower of claim 1 wherein the reinforcing elements are disposed transversely to the vertical joints and extending at least partially through the at least two segments.

7. The wind turbine tower of claim 1 wherein the reinforcing elements are partially embedded in the at least two segments.

8. The wind turbine tower of claim 1 wherein the reinforcing elements are selected between a bolt or a rebar.

9. The wind turbine tower of claim 1 wherein the reinforcing elements are configured to connect the segments between them.

10. The wind turbine tower of claim 1 wherein the tower is, at least partially, made of concrete.

\* \* \* \* \*